July 26, 1949.  M. V. ROBBINS  2,477,088
CLOTHESPIN
Filed March 21, 1947
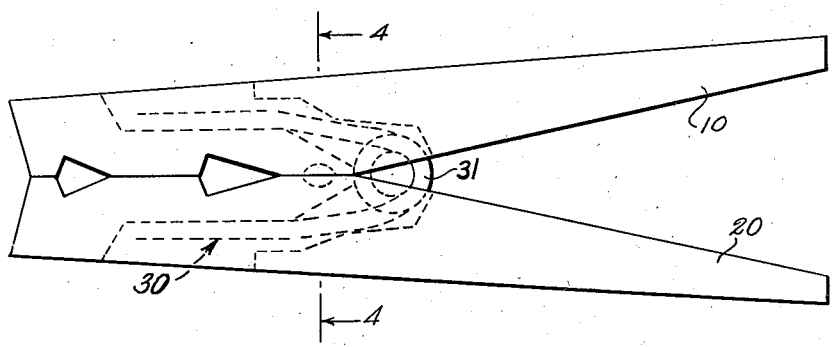
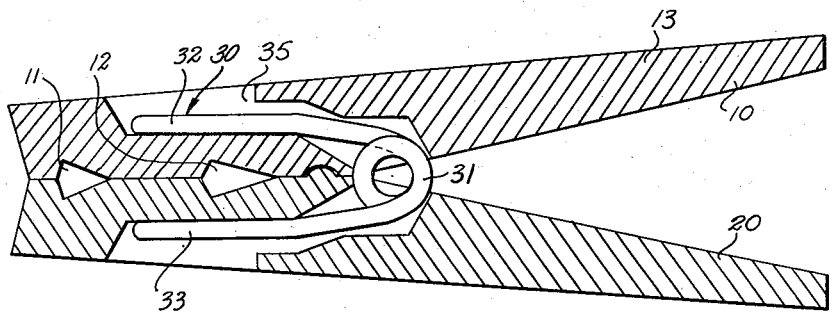
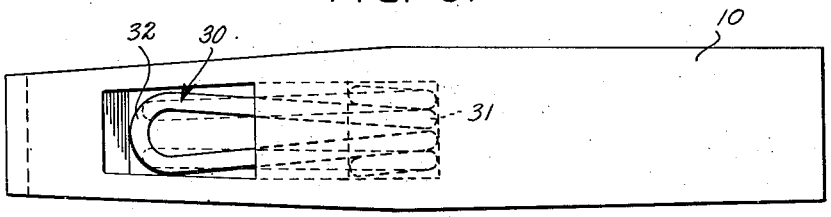
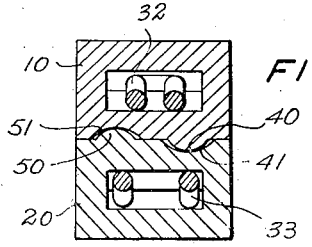
INVENTOR.
MARTIN V. ROBBINS,
BY
ATTORNEYS.

Patented July 26, 1949

2,477,088

UNITED STATES PATENT OFFICE 2,477,088

CLOTHESPIN

Martin V. Robbins, Folsom City, Calif.

Application March 21, 1947, Serial No. 736,209

2 Claims. (Cl. 24—137)

This invention relates to clothespins, and more particularly to a clothespin of the spring-pressed type.

A principal object of the invention is to provide a clothespin that will be simple and economical to manufacture.

Another object of the invention is to provide a spring-pressed clothespin in which no part of the metal spring can touch the clothes.

Another object of the invention is to provide a clothespin of the type mentioned wherein the components are not likely to come apart.

Another object of the invention is to provide a spring-pressed clothespin in which the stress on the spring is reduced to a minimum.

Other objects and advantages of this invention will become apparent to those skilled in the art during the course of the following description.

The accompanying drawings represent a preferred embodiment of the invention.

In these drawings:

Figure 1 is a side elevation of the new and improved clothespin.

Figure 2 is a vertical section through the clothespin.

Figure 3 is a plan view of the pin.

Figure 4 is a vertical section taken through the line 4—4 of Figure 1.

The clothespin constituting the present invention comprises two symmetrical legs 10 and 20, and a cooperating spring 30. Each leg has a cut-out portion 11, 12, for the purpose of providing gripping teeth for the clothes. The rear portion 13 of each leg is tapered to constitute a lever with its fulcrum at approximately its center. The spring 30 is formed of a double piece of spring wire, and comprises a helical portion 31 and upper and lower bearing portions 32 and 33.

Each of the legs 10 and 20 is provided with an internal recess 35 to contain the bearing portions 32 and 33 of the spring 30. The recess 35 in each leg extends between the opposed faces thereof, and comprises an upwardly-extending portion merging into its outer face, a downwardly-extending portion merging into its inner face, and a substantially horizontal intermediate connecting portion. The legs 10 and 20 are arranged so that the downwardly-extending portions of the recesses are in registry with each other so as to provide an aperture for the reception of the helical portion 31 of the spring 30 therein, with the upwardly-projecting portions of the recesses in opposed aligned relation. This recess 35 is of sufficient depth so that the bearing portions 32 and 33, respectively, are wholly beneath the surface of the clothespin legs 10 and 20. Consequently, there will be no risk of catching the clothes on the metal portions of the clothespin.

The central portion of the leg 10 is provided with a spherical protuberance 40, and this protuberance 40 is adapted to ride in a similar concavity 41 in the leg 20. Similarly, the leg 20 is provided with a spherical protuberance 50 that rides in the concavity 51 in the leg 10. These protuberances 40 and 50 will act as a fulcrum or bearings for the legs 10 and 20, the fulcrum being located at a point spaced from the outer ends of said legs. It is to be noted that the upwardly-extending portions of the recesses 35 are arranged forwardly of the fulcrum while the downwardly-extending portions of said recesses are arranged rearwardly of the fulcrum.

It will be observed that the spring 30 acts only to keep the forward portions of the legs 10 and 20 together. The helical portion 31 of the spring 30 does not act as a fulcrum or bearing member. Consequently, the strain on the spring 30 will be reduced to a minimum.

The construction of the protuberances 40 and 50 is such as to prevent lateral or longitudinal displacement of the legs 10 and 20 relative to each other. No nails, rivets, or other fastening means are required to hold the spring 30 in place. The recess 35 is such that neither the helical portion 31 nor either of the bearings portions 32 and 33 of the spring will be in contact with the upper portion of the leg, either in the closed position of the clothespin or in the open position. Since each bearing portion of the spring 30 is contained within the recess 35, no portion thereof will come in contact with the clothes or with the hands, thereby avoiding damage and injury, as well as protecting the spring 30 from moisture.

What is claimed is:

1. A clothespin comprising a pair of symmetrical legs mounted for opening and closing movement with respect to each other about a fulcrum located at a point spaced from the outer ends of said legs, each of said legs having an internal recess extending between the opposite faces of said leg, the recess in each leg comprising an upwardly-extending portion arranged forwardly of said fulcrum and merging into its outer face, a downwardly-extending portion arranged rearwardly of said fulcrum and merging into its inner face, and a substantially horizontal intermediate connecting portion, said legs being arranged so that the downwardly-extending portions of the recesses are in registry with each other so as to provide an aperture, and a spring having a helical portion arranged intermediate its ends, the helical portion of said spring being mounted in said aperture with an end thereof extending through the intermediate and upwardly-extending portions of the recess of the leg complemental thereto to thereby provide a means for causing an opening and closing movement of said legs.

2. A clothespin comprising a pair of symmetrical legs mounted for opening and closing movement with respect to each other about a fulcrum located at a point spaced from the outer ends of said legs, each of said legs having an internal recess extending between opposite faces of said leg, the recess in each leg comprising an upwardly-extending portion arranged forwardly of said fulcrum and merging into its outer face, a downwardly-extending portion arranged rearwardly of said fulcrum and merging into its inner face, and a substantially horizontal intermediate connecting portion, said legs being arranged so that the downwardly-extending portions of the recesses are in registry with each other so as to provide an aperture, and a spring having a helical portion arranged intermediate its ends, the helical portion of said spring being mounted in said aperture, with an end thereof extending through the intermediate and upwardly-extending portions of the recess of the leg, complemental thereto to thereby provide a means for causing opening and closing movement of said legs, each of said legs having a plurality of angular cut-out portions spaced from each other and positioned forwardly of said fulcrum, said cut-out portions being arranged in registering relation with respect to each other to form gripping teeth.

MARTIN V. ROBBINS.

REFERENCES CITED

The following references are of record in the file of this patent:

UNITED STATES PATENTS

| Number | Name | Date |
|---|---|---|
| 57,977 | Sanborn | Sept. 11, 1866 |
| 187,291 | Lockwood | Feb. 13, 1877 |
| 1,357,233 | Hagelstein | Nov. 2, 1920 |
| 2,255,467 | Kabriel | Sept. 9, 1941 |
| 2,409,379 | Mosaly | Oct. 15, 1946 |

FOREIGN PATENTS

| Number | Country | Date |
|---|---|---|
| 634,684 | Germany | Aug. 13, 1936 |